(12) United States Patent
Balasubramanian

(10) Patent No.: US 11,832,073 B2
(45) Date of Patent: Nov. 28, 2023

(54) SYSTEM AND METHOD FOR IMPROVED CONTENT CASTING AUDIO MANAGEMENT

(71) Applicant: ARRIS ENTERPRISES LLC, Suwanee, GA (US)

(72) Inventor: Sundaramoorthy Balasubramanian, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 70 days.

(21) Appl. No.: 17/539,375

(22) Filed: Dec. 1, 2021

(65) Prior Publication Data

US 2022/0210557 A1    Jun. 30, 2022

Related U.S. Application Data

(60) Provisional application No. 63/132,064, filed on Dec. 30, 2020.

(51) Int. Cl.
*H04B 3/00* (2006.01)
*H04R 3/12* (2006.01)
*G06F 3/16* (2006.01)

(52) U.S. Cl.
CPC ............ *H04R 3/12* (2013.01); *G06F 3/165* (2013.01); *H04R 2420/00* (2013.01)

(58) Field of Classification Search
CPC ........ H04R 3/12; H04R 2420/07; G06F 3/165

USPC ................................................. 381/77, 80
See application file for complete search history.

(56) References Cited

U.S. PATENT DOCUMENTS

| | | | |
|---|---|---|---|
| 2019/0320219 A1 | 10/2019 | Yoden | |
| 2020/0128620 A1* | 4/2020 | Han | H04W 76/15 |
| 2020/0252678 A1 | 8/2020 | Elliot et al. | |
| 2021/0006915 A1* | 1/2021 | Hegde | H04N 21/43615 |

OTHER PUBLICATIONS

International Search Report and Written Opinion for Application No. PCT/US2021/061349 dated Mar. 8, 2022 (7 pages).

* cited by examiner

*Primary Examiner* — Ammar T Hamid
(74) *Attorney, Agent, or Firm* — Panitch Schwarze Belisario & Nadel LLC

(57) ABSTRACT

A system and method for providing improved content casting audio management. In particular, the disclosed technology enables a user to selectively direct the audio associated with cast video content to an alternate wireless audio device or system, such as a set of wireless headphones. The technology provides for the sensing of a user's utilization of a wireless audio device prior to the initiation of the casting, and responsively route the casted content audio to those same headphones. The technology also provides for querying a user as to their desire to utilize a wireless audio device prior to initiating content casting.

20 Claims, 4 Drawing Sheets

SYSTEM AND METHOD FOR IMPROVED CONTENT CASTING AUDIO MANAGEMENT

CROSS-REFERENCE TO RELATED APPLICATION

This application claims the benefit of U.S. Provisional Patent Application No. 63/132,064, filed Dec. 30, 2020, which is incorporated by reference herein in its entirety.

BACKGROUND OF THE INVENTION

It has become a common practice to wirelessly transfer or "cast" a particular video content accessed via or stored upon a smart device, such as a phone, tablet digital assistant or a computer, to an alternate screen (usually a digital television or other large-format screen). Casting is typically supported by a common wireless digital network (such as networks conforming to IEEE standards 802.11 or 802.15) shared by both the casting device and the targeted screen. Such casting can prove advantageous for sharing the content with a group or simply when a more immersive viewing experience is desired or appropriate. Casting is initiated from a smart device via a downloaded application or native functionality suited to mate with the interface of the particular targeted screen device. The application/interface pairings commonly in use include the "Cast" function available upon devices running Android™ operating systems, Google's Chromecast application, or Apple's Airplay 2.

When casting is initiated, the video and audio associated with the cast content are sent to the targeted screen device; the video is displayed and the audio is played through the audio system or speakers associated with the targeted screen. While having both the video and audio portions of the cast content sent to the targeted display device is appropriate for many viewing situations, it may not always be desirable. For example, in a situation where the individual initiating the casting desires to view the casted content on an alternate screen, but the particular viewing environment requires the use of headphones (sleeping child, others working, reading, or consuming other media content). Unfortunately, present casting applications and functionalities not don't present users with an option to direct the audio and video portions of cast content to disparate devices. There exists a need to provide a simple system and method enabling users to cast content video to an alternate display and cast content audio to an alternate device such as headphones.

BRIEF SUMMARY OF THE INVENTION

A system and method for providing improved content casting audio management. In particular, the disclosed technology enables a user to selectively direct the audio associated with cast video content to an alternate wireless audio device or system, such as a set of wireless headphones. The technology provides for the sensing of a user's utilization of a wireless audio device prior to the initiation of the casting, and responsively route the casted content audio to those same headphones. The technology also provides for querying a user as to their desire to utilize a wireless audio device prior to initiating content casting.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1A:
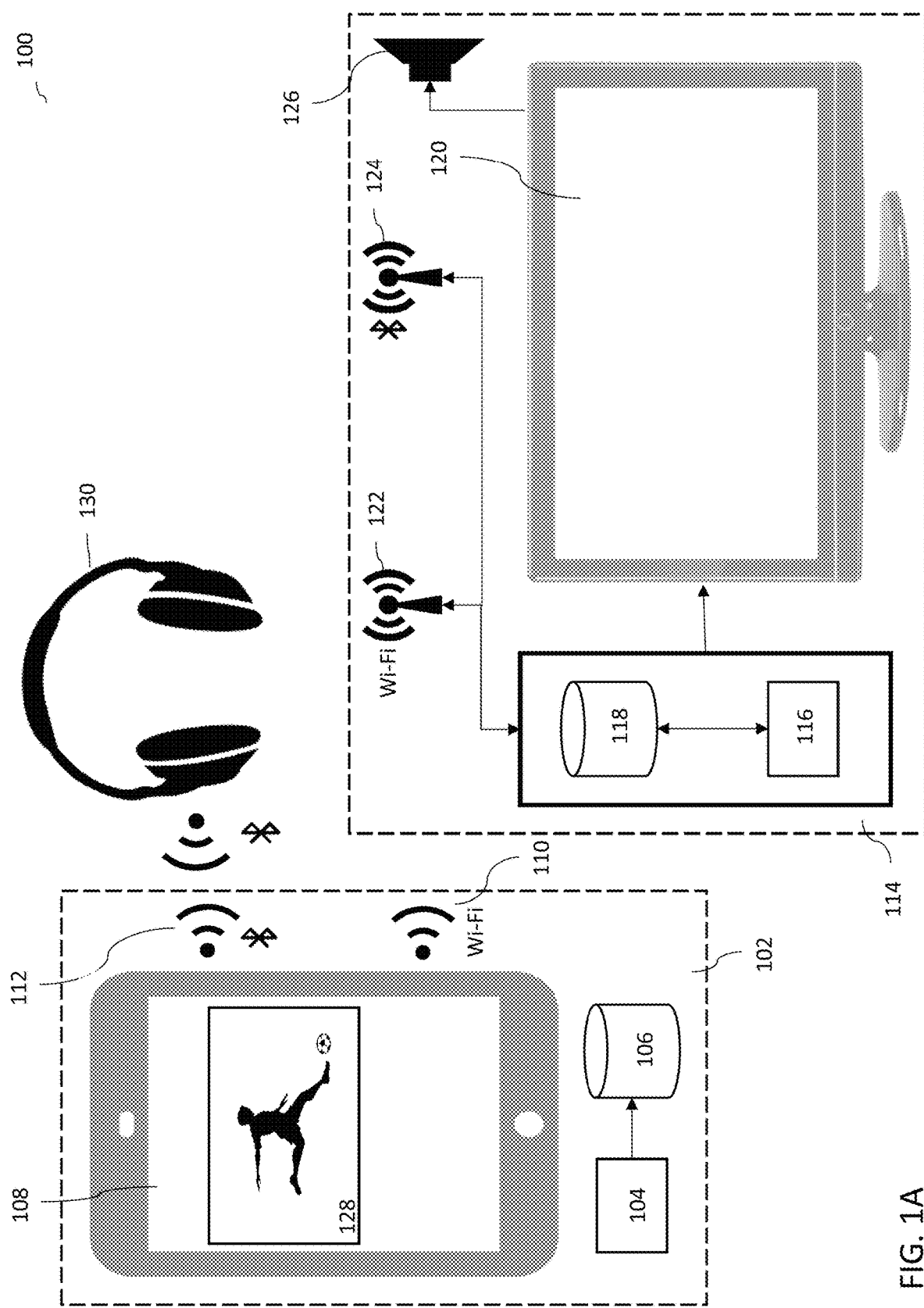
FIGS. 1A and 1B are functional block diagrams of a first preferred embodiment of a system (100) adapted to provide improved content casting audio management.

FIG. 1A is a functional diagram of a first preferred embodiment of a system (100) adapted to provide improved content casting audio management. As shown, the system comprises smartphone 102, which includes processor 104, memory 106, touchscreen 108, Bluetooth transceiver 110 and Wi-Fi transceiver 112. Processor 104 is adapted to utilize protocol information stored in memory 106 to enable the casting of content to compatible alternate display devices. Alternate display device 114, a digital television ("DTV") is also shown. DTV 114 includes processor 116, memory 118, display 120, Wi-Fi transceiver 122, Bluetooth transceiver 124 and audio system 126.

Figure 2:
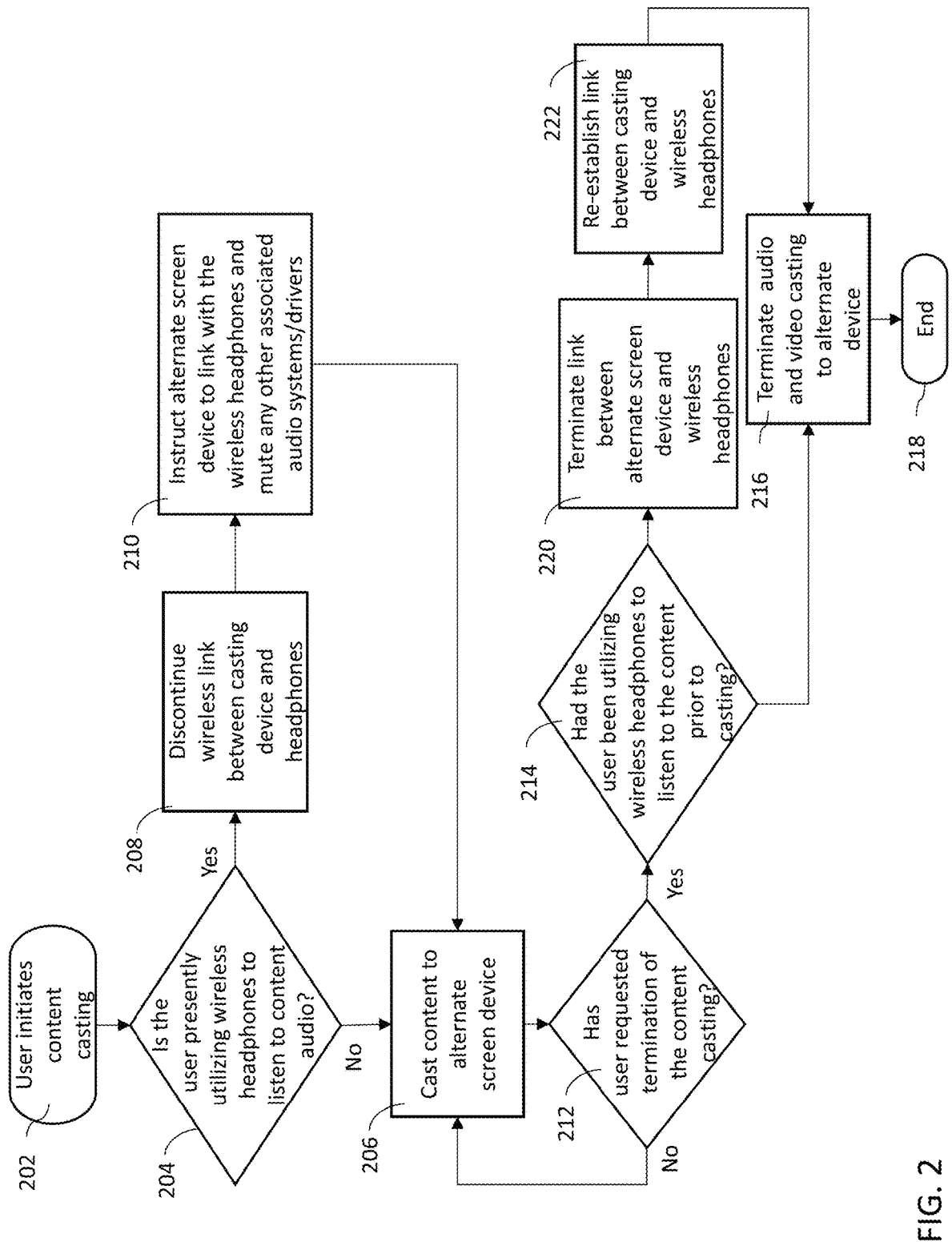
FIG. 2 is a flow diagram of a first process supported by the system of FIG. 1.

As shown in FIG. 1A, is presently being utilized to view content 128 via display 108. Processor 104 is routing the audio associated with content 126 to wireless headphones 130 via Bluetooth transceiver 112. The user of smartphone 102 has brought the device within range of the wireless network supported by Wi-Fi transceiver 122 and established a connection thereto. The user of smartphone 102 then initiates the casting of content 128 to DTV 114 by instructing processor 104 to execute a casting program or application stored in memory 106. This execution would typically be performed in response to a command received via touchscreen 108 and is depicted as step 202 in FIG. 2.

Figure 1B:
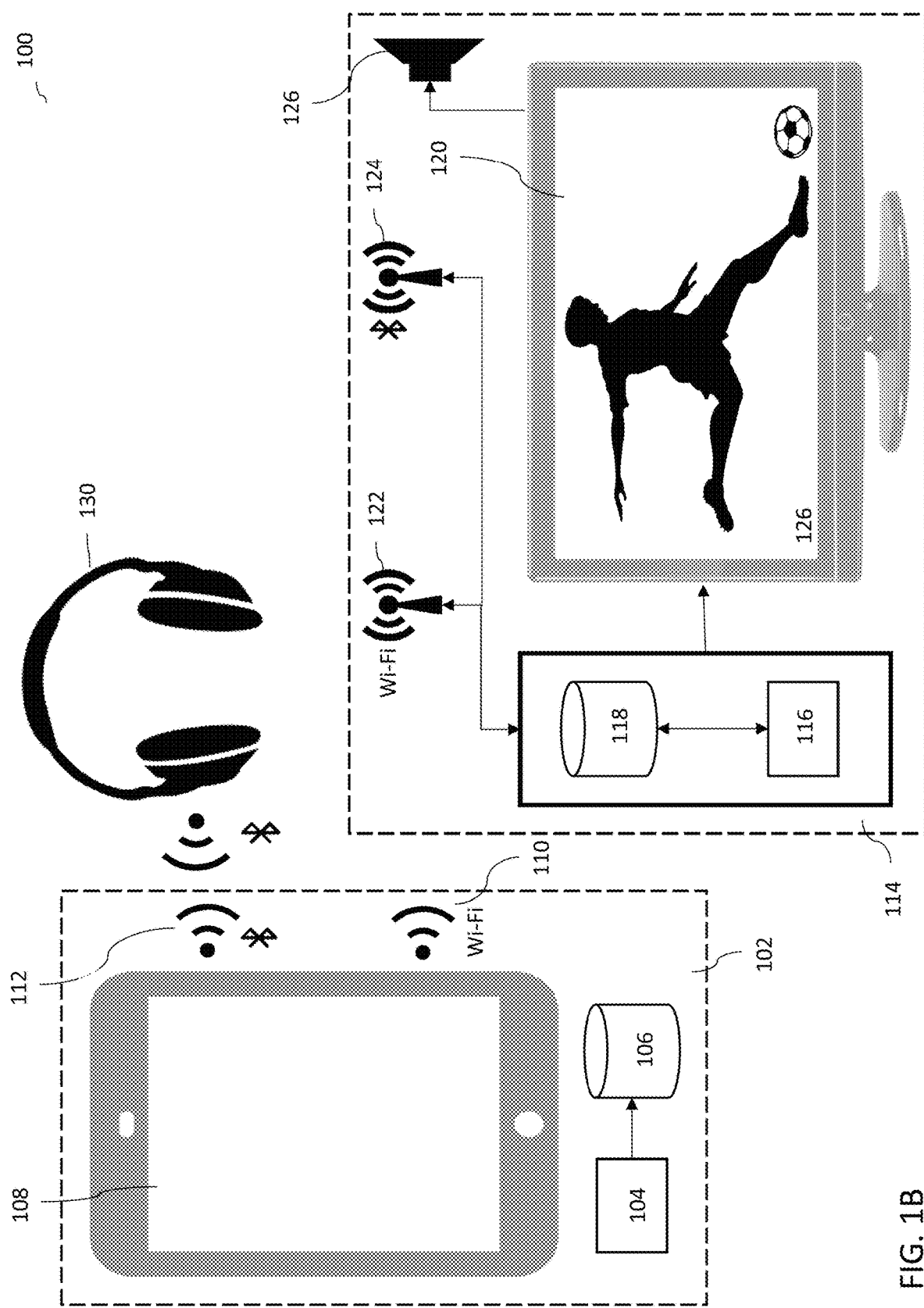

After the casting program is initiated, processor 104 determines if the user had been utilizing wireless headphones 130 to listen to the audio associated with content 128 (see step 204). If it was determined that the user was not utilizing wireless headphones, the process would continue with step 206. Content 128 would be cast from smartphone 102 to DTV 114, Video would be viewed upon display 120 and audio However, if it was found that wireless headphones 130 were in use, processor 104 would discontinue the Bluetooth link between the headphones and smartphone 102 (step 206, and then instruct DTV 114 to establish a Bluetooth link to headphones 130, and to audio system 126 (step 210). Such an instruction would be communicated via wireless network 122. The process would then proceed with step 206, casting content 128 to DYV 114. The video would be displayed upon screen 120 and the audio would be heard by the user via wireless headphones 130 (see FIG. 1B).

Processor 104 would then await a command from the user to terminate the casting; typically initiated from touchscreen 108 (step 212). Upon receiving a request to terminate the casting, processor 104 determines if the user had been employing wireless headphones 130 to listen to the casted content audio (step 214). If not, the casting is terminated (both audio and video) (step 216), and the process terminates (218). The content would then revert to touch screen 108 and internal audio drivers within smartphone 102.

If processor 104 finds that the user was employing wireless headphones 130, then it would instruct DTV 114 to terminate the Bluetooth link to the headphones (220) and re-establish a Bluetooth link between smartphone 102 and wireless headphones 130 (step 222). The casting would then be terminated (steps 216 and 218). The video of content 128 would revert to touchscreen 108 and the associated audio could be heard by a user through wireless headphones 130.

Figure 3:
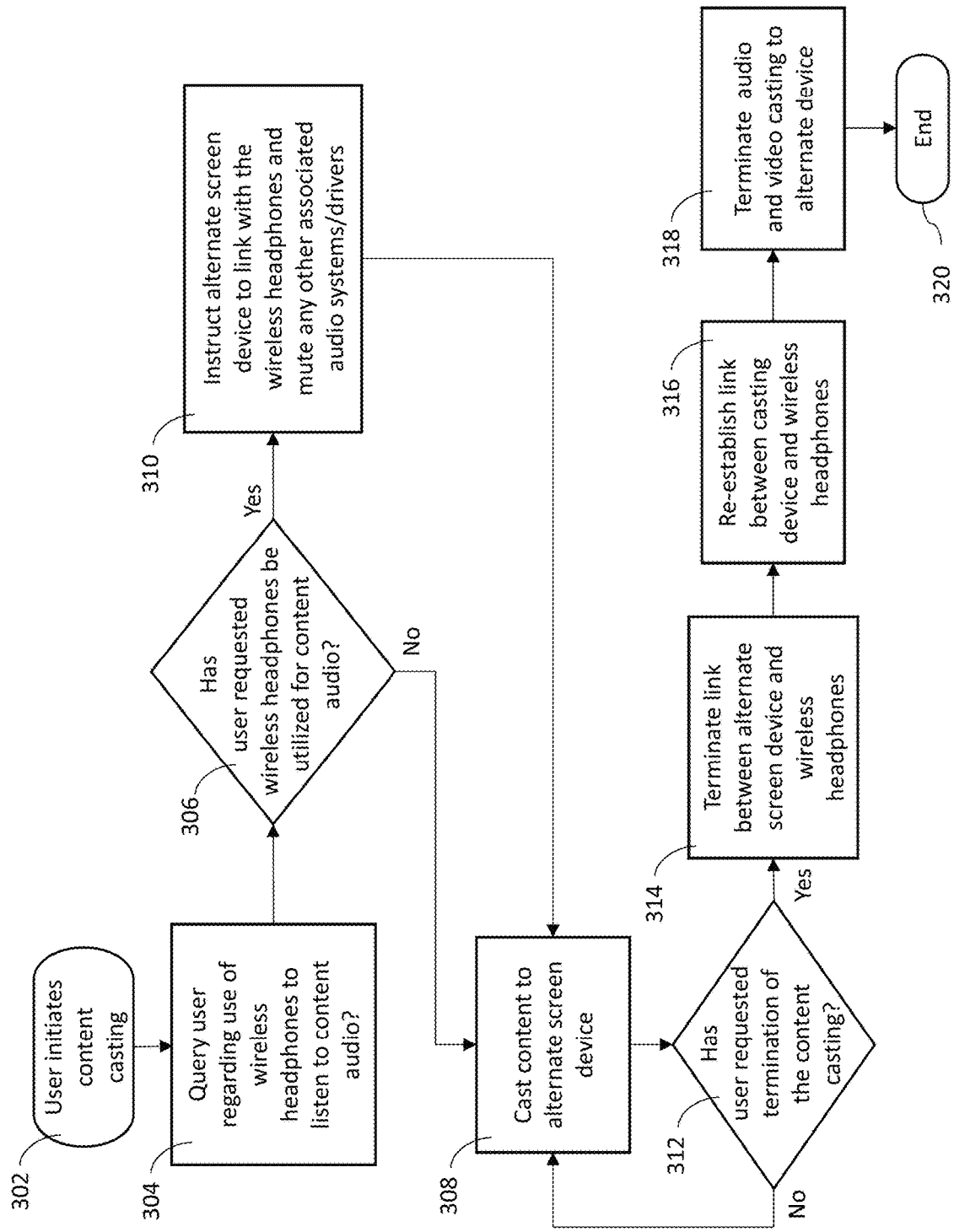
FIG. 3 is a flow diagram of an alternate process supported by the system of FIG. 1.

FIG. 3 provides a flow diagram for an alternate process supported by system 100. After the content casting process is initiated (302), processor 104 generates a query to the user asking if he or she would like to utilize wireless headphones to listen to the audio associated with the content to be cast (304). This query could be a graphic prompt displayed upon touchscreen 108 or a recorded or synthesized spoken prompt played upon smartphone 102. If the user responds in the negative, the process continues with content 128 being cast to DTV 114 (steps 306 and 308). However, if the user provides an affirmative response to the query, processor 104 instructs DTV 114 to establish a Bluetooth connection with wireless headphones 130 (steps 306 and 310). The process would then proceed with step 308, casting content 128 to DYV 114. The video being displayed upon screen 120 and the audio being played through wireless headphones 130.

Processor 104 would then await the detection of a user command to terminate the casting (step 312). Upon receiving such a command, processor 104 processor 104 instructs DTV 114 to establish a Bluetooth connection with wireless headphones 130 (steps 306 and 310). The process would then proceed with step 308, casting content 128 to DYV 114. The video being displayed upon screen 120 and the audio being played through wireless headphones 130.

Although the invention herein has been described with reference to particular embodiments, it is to be understood that these embodiments are merely illustrative of the principles and applications of the present invention. For example, the casting device could be a smartphone, a tablet, a digital assistant or any similar device capable of executing a casting program and linking to a wireless audio device. Similarly, the device to which the content is cast could be a DTV, a computer, or a media gateway device (set-top box, etc.). It would also be within the scope of the disclosed invention to utilize a wireless audio device other than a set of wireless headphones. Any audio device capable of receiving a Bluetooth would be suitable, including powered speakers, amplifiers, etc. It will also be understood that all or part of the above-described processing and storage associated with smartphone 102 and/or DTV 114 could be performed in whole or in-part by an offsite server or processing means linked to these devices by a wired or wireless network. All of the above variations and reasonable extensions therefrom could be implemented and practiced without departing from the spirit and scope of the present invention as defined by the appended claims.

The invention claimed is:

1. A system for providing improved content casting audio management, comprising:
   at least one memory configured to store information indicative of protocols suitable for wirelessly casting content to at least one content receiving device;
   at least one wireless audio device configured to receive and reproduce content audio;
   at least one screen configured to display content video, wherein the at least one wireless audio device, the at least one screen, and the at least one content receiving device are disparate devices; and
   at least one processor wirelessly linked to the at least one wireless audio device,
   wherein the at least one processor is adapted to:
      receive a user request from a user viewing the at least one screen to cast content being viewed upon the at least one screen to the at least one receiving device;
      sense a user's utilization of the at least one wireless audio device prior to initiating casting;
      terminate the wireless link to the at least one wireless audio device, based, at least in part, upon the determination;
      instruct the at least one receiving device to establish a wireless link to the at least one wireless audio device sensed by the at least one processor as being utilized by the user;
      responsively route the content audio to the at least one wireless audio device; and
      cast the content being viewed upon the at least one screen to the at least one receiving device.

2. The system of claim 1 wherein the at least one processor is further adapted to:
   receive a user request to terminate the wireless casting of content to the at least one receiving device;
   instruct the at least one receiving device to terminate the wireless link to the at least one wireless device based, at least in part, upon the reception of the termination request;
   establish a wireless link to the at least one wireless device;
   terminate the casting of the content to the at least one receiving device;
   display the content upon the at least one screen; and
   reproduce the audio associated with content utilizing the at least one wireless audio device.

3. A system for providing improved content casting audio management, comprising:
   at least one memory adapted to store information indicative of protocols suitable for casting content to at least one content receiving device;
   at least one wireless audio device adapted to receive and reproduce content audio;
   at least one screen adapted to display content video, wherein the at least one wireless audio device, the at least one screen, and the at least one content receiving device are disparate devices; and
   at least one processor wirelessly linked to the at least one audio device,
   wherein the at least one processor is adapted to:
      receive a user request from a user viewing the at least one screen to cast content being viewed upon the at least one screen to the at least one receiving device;
      sense a user's utilization of the at least one wireless audio device prior to initiating casting;
      generate a query to the user regarding the use of the at least one wireless audio device sensed by the at least one processor to reproduce audio associated with content being viewed upon the at least one screen;
      instruct the at least one receiving device to establish a wireless link to the at least one wireless audio device, based, at least in part, upon a response to the generated query;
      responsively route the content audio to the at least one wireless audio device; and
      cast the content being viewed upon the at least one screen to the at least one receiving device.

4. The system of claim 3 wherein the generated query comprises at least one of the following: a graphic displayed upon the at least one screen; and an audible message.

5. The system of claim 3 wherein the at least one processor is further adapted to:
   receive a user request to terminate the casting of content to the at least one receiving device;

instruct the at least one receiving device to terminate the wireless link to the at least one wireless device based, at least in part, upon the reception of the termination request;

establish a wireless link to the at least one wireless device;

terminate the casting of the content to the at least one receiving device; display the content upon the at least one screen; and reproduce the audio associated with content utilizing the at least one wireless audio device.

6. The system of claim 1, 2, 3 or 5 wherein the at least one memory, the at least one screen and the at least one processor collectively comprise one of the following: a smartphone; a tablet; a computer; and digital assistant.

7. The system of claim 1, 2, 3 or 5 wherein the at least one wireless audio device comprises one of the following: wireless headphones; a powered speaker; an audio amplifier; a Bluetooth device.

8. The system of claim 1, 2, 3 or 5 wherein the wireless casting of content is supported by a wireless network conforming to at least one of the following protocols: a Wi-Fi protocol; IEEE 802.11; and IEEE 802.15.

9. The system of claim 1, 2, 3 or 5 wherein the at one receiving device comprises at least one of the following: a digital television; a computer; a media gateway device; and a set-top box.

10. The system of claim 1, 2, 3 or 5 wherein the wireless transmission of content audio is supported by a Bluetooth network.

11. A method for providing improved content casting audio management, in a system comprising:

at least one memory adapted to store information indicative of protocols suitable for wirelessly casting content to at least one content receiving device;

at least one wireless audio device adapted to receive and reproduce content audio; and at least one screen adapted to display content video, wherein the at least one wireless audio device, the at least one screen, and the at least one content receiving device are disparate devices;

the method comprising the steps of:

receiving a user request from a user viewing the at least one screen to cast content being viewed upon the at least one screen to the at least one receiving device;

sensing a user's utilization of the at least one wireless audio device prior to initiating casting;

terminating the wireless link to the at least one wireless device, based, at least in part, upon the determination;

instructing the at least one receiving device to establish a wireless link to the at least one wireless audio device sensed by the at least one processor as being utilized by the user;

responsively routing the content audio to the at least one wireless audio device; and casting the content being viewed upon the at least one screen to the at least one receiving device.

12. The method of claim 11, further comprising the steps of:

receiving a user request to terminate the wireless casting of content to the at least one receiving device;

instructing the at least one receiving device to terminate the wireless link to the at least one wireless device based, at least in part, upon the reception of the termination request;

establishing a wireless link to the at least one wireless device;

terminating the casting of the content to the at least one receiving device;

displaying the content upon the at least one screen; and reproducing the audio associated with content utilizing the at least one wireless audio device.

13. A method for providing improved content casting audio management, in a system comprising:

at least one memory adapted to store information indicative of protocols suitable for casting content to at least one content receiving device;

at least one wireless audio device adapted to receive and reproduce content audio; and at least one screen adapted to display content video, wherein the at least one wireless audio device, the at least one screen, and the at least one content receiving device are disparate devices;

the method comprising the steps of:

receiving a user request from a user viewing the at least one screen to cast content being viewed upon the at least one screen to the at least one receiving device;

sensing a user's utilization of the at least one wireless audio device prior to initiating casting;

generating a query to the user regarding the use of the at least one wireless audio device sensed by the at least one processor to reproduce audio associated with content being viewed upon the at least one screen;

instructing the at least one receiving device to establish a wireless link to the at least one wireless audio device, based, at least in part, upon a response to the generated query;

responsively routing the content audio to the at least one wireless audio device; and casting the content being viewed upon the at least one screen to the at least one receiving device.

14. The method of claim 13 wherein the generated query comprises at least one of the following: a graphic displayed upon the at least one screen; and an audible message.

15. The method of claim 13 further comprising the steps of:

receiving a user request to terminate the casting of content to the at least one receiving device;

instructing the at least one receiving device to terminate the wireless link to the at least one wireless device based, at least in part, upon the reception of the termination request;

establishing a wireless link to the at least one wireless device; terminating the casting of the content to the at least one receiving device;

displaying the content upon the at least one screen; and reproducing the audio associated with content utilizing the at least one wireless audio device.

16. The method of claim 11, 12, 13 or 15 wherein the at least one memory, the at least one screen and the at least one processor collectively comprise one of the following: a smartphone; a tablet; a computer; and digital assistant.

17. The method of claim 11, 12, 13 or 15 wherein the at least one wireless audio device comprises one of the following: wireless headphones; a powered speaker; an audio amplifier; a Bluetooth device.

18. The method of claim 11, 12, 13 or 15 wherein the wireless casting of content is supported by a wireless network conforming to at least one of the following protocols: a Wi-Fi protocol; IEEE 802.11; and IEEE 802.15.

19. The method of claim 11, 12, 13 or 15 wherein the at one receiving device comprises at least one of the following: a digital television; a computer; a media gateway device; and a set-top box.

20. The method of claim 11, 12, 13 or 15 wherein the wireless transmission of content audio is supported by a Bluetooth network.

\* \* \* \* \*